US Patent [19] Flick et al.

[11] 4,427,907
[45] Jan. 24, 1984

[54] SPIRAL PANCAKE ARMATURE WINDING MODULE FOR A DYNAMOELECTRIC MACHINE

[75] Inventors: Carl Flick; Richard D. Nathenson, both of Pittsburgh, Pa.

[73] Assignee: Electric Power Research Institute, Inc., Palo Alto, Calif.

[21] Appl. No.: 324,295

[22] Filed: Nov. 23, 1981

[51] Int. Cl.³ .............................................. H02K 9/19
[52] U.S. Cl. ...................................... 310/52; 310/54; 310/64
[58] Field of Search .................... 310/52, 54, 58, 59, 310/60 R, 60 A, 61, 64, 65, 254, 270, 179, 214, 264, 206, 265, 198

[56] References Cited

U.S. PATENT DOCUMENTS

| 4,143,290 | 3/1979 | Mizukami et al. | 310/270 |
| 4,151,433 | 4/1979 | Flick | 310/54 |
| 4,164,672 | 8/1979 | Flick | 310/54 |
| 4,339,681 | 7/1982 | Bogner et al. | 310/201 |
| 4,361,776 | 11/1982 | Hayashi et al. | 310/268 |
| 4,368,399 | 1/1983 | Ying et al. | 310/270 |

FOREIGN PATENT DOCUMENTS 53-34188 10/1979 Japan ...................................... 310/91

Primary Examiner—J. D. Miller
Assistant Examiner—D. L. Rebsch
Attorney, Agent, or Firm—William D. Lanyi

[57] ABSTRACT

A pancake armature winding in which the turns of each phase coil are insulated to withstand turn-to-turn voltage potential has phase-to-phase insulation provided by inner and outer insulative skins which act cooperatively with insulative filler pieces which also provide mechanical support for the phase coil. The reduced amount of insulation on each turn of the phase coil permits the overall size of the pancake coil to be reduced. The armature winding is supported mechanically by inner and outer insulative cylinders.

6 Claims, 11 Drawing Figures

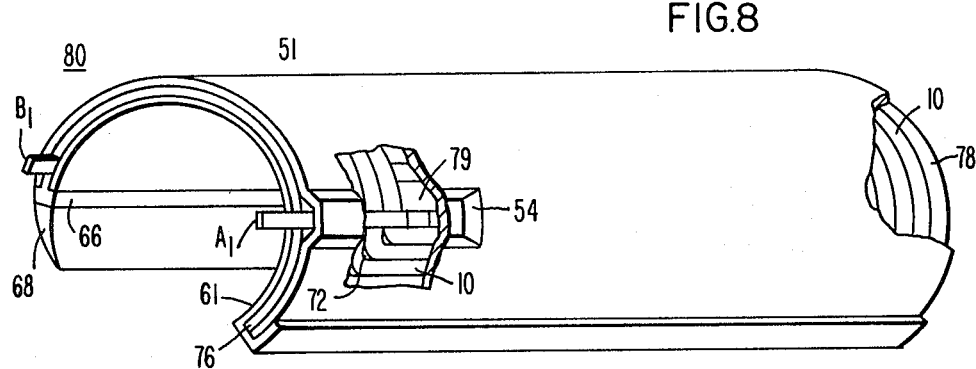
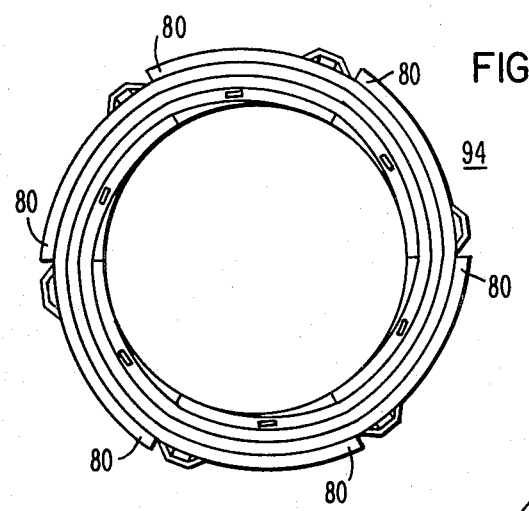
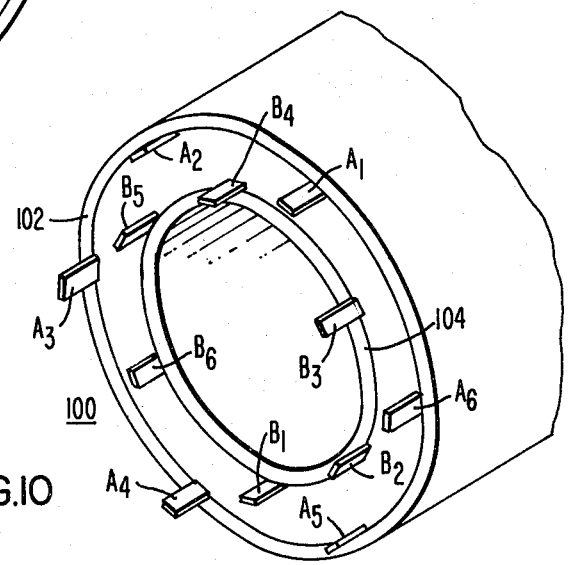

SPIRAL PANCAKE ARMATURE WINDING MODULE FOR A DYNAMOELECTRIC MACHINE

BACKGROUND OF THE INVENTION

The present invention relates generally to the stator windings of dynamoelectric machines and, more specifically, to the airgap armature windings of superconducting synchronous generators.

Typically, stator coils of superconducting generators are airgap armature coils having no stator core to directly support them. As the technology related to superconducting generators has developed, some of its elements were adapted from conventional generator designs while other elements represent innovative departures from conventional design practices. Conventional stator coils must each be insulated in a manner sufficient to prevent an electrical path between the coil, which is at its phase potential or a fraction thereof, and the immediately adjacent stator core, which is essentially at ground potential. Accordingly, each individual stator coil in a conventional generator is encompassed with sufficient insulation to withstand this electrical potential.

As superconducting generators were initially developed, this design criterion was continued even though the superconducting generator had no ground potential stator core in intimate contact with its stator coils. The removal of the stator core from intimate contact with stator coils in superconducting generators, besides eliminating the need for phase to ground insulative capabilities, creates a need for mechanically supporting the stator coils in a manner different from what was heretofore used. In conventional generators, as described above, the stator core, in conjunction with a plurality of wedges, provides the physical support required by the stator coils within the length spanned by the stator core. The end turns, which are not directly supported by the core, require alternate provisions which have been the subject of much research and numerous patents. In superconducting generators this mechanical support must also be provided in alternate ways. It is an object of the present invention to provide this required mechanical support of the stator coils while also minimizing the insulation applied to each conductor and thus reduce the space requiements of the stator coil assembly.

Armature windings of both conventional and superconducting generators require some means of cooling to remove the heat produced by ohmic and eddy current electrical losses in the conductors. Former methods of providing this cooling require multiple fluid connections for each phase coil. This technique is described in U.S. Pat. No. 4,164,672 issued to Flick on Aug. 14, 1979.

SUMMARY OF THE INVENTION

It is the general object of the present invention to provide the necessary insulation, physical support and coolant connections for modular stator coils of a superconducting dynamoelectric machine in a manner that reduces the armature winding's space requirements while making it more amenable to inspection and maintenance procedures.

The present invention includes a stator coil winding for a dynamoelectric machine in which the phase coils are formed in a spiral pancake configuration. Each phase coil comprises an electrical conductor formed into a plurality of series connected concentric turns. The phase coils are then arranged in an interleaved spiral fashion. Each phase coil occupies a significant amount of volume that is valuable for accommodating the armature winding. Therefore, it is an object of this invention to simplify the cooling connections of the armature coils so as to minimize the amount of valuable volume that must be dedicated to this function. The former method of locating the cooling fluid connections, as shown in U.S. Pat. No. 4,164,672 issued to Flick on Aug. 14, 1979, results in these connections being inaccessible for inspection after completion of the armature construction. Accordingly, it is a further object of this invention to simplify and reduce the number of cooling fluid connections and to position them so as to make them more accessible for inspection and maintenance.

Each individual turn of the phase coil is insulated to withstand turn-to-turn voltage potential. The entire armature winding assembly, however, is provided with sufficient insulative capacity to withstand phase-to-phase voltage potential between phase coils. Each phase coil is provided with insulative skins disposed on its radially inward and outward surfaces. Additional insulative elements are provided at its outer edges and at the center of its concentrically wound configuration.

In the aggregate, insulative members not only provide adequate electrical insulation between each phase coil and its adjacent phase coils but also provide sufficient mechanical support to withstand the stresses to which the phase coil is subjected during both normal and abnormal operating conditions.

BRIEF DESCRIPTION OF THE DRAWINGS

The present invention will be further described, in greater detail, in the following description of the preferred embodiment in conjunction with the accompanying figures, in which:

FIG. 8 illustrates a phase coil module of the present invention encapsulated by the insulative components of the present invention;

FIG. 9 shows an end view of a stator coil assembly comprising six pancake coil modules configured in a spiral manner; and FIG. 10 shows an assembly of six phase coil modules, configured to form an armature winding, with details such as parting and bonded lines between adjacent components being omitted for purposes of clarity.

DESCRIPTION OF THE PREFERRED EMBODIMENT

Figure 1:
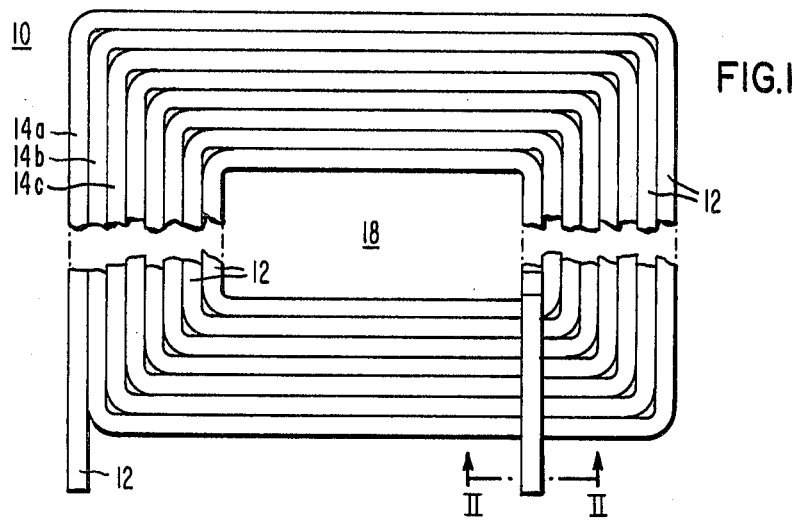
FIG. 1 shows a developed view of a phase coil of the present invention.

The concentrically wound phase coil of the present invention is depicted in FIG. 1. It should be understood that, although the phase coil 10 is shown in FIG. 1 as being flat for purposes of illustration, it is actually configured as a spirally arcuate section which can be associated with other similarly configured phase coils to form a cylindrical stator winding comprising spiralling, interleaved phase coil modules.

The phase coil 10 of FIG. 1 shows the multiple concentric turns of a conductor 12 in a developed view. The individual turns (14a, 14b, 14c, etc.) are wound in such a way as to form an electrical series armature phase coil 10 around a central cavity 18.

The phase coil of the present invention as shown in FIG. 1 differs significantly from conventional phase coils by the noticeable reduction in interturn insulation. As is apparent from FIG. 1, the adjacent turns are not separated by a space in which insulative blocks or layers can be disposed. The conductor 12 is covered only with sufficient insulation to withstand turn-to-turn voltage potentials. Previously, superconducting stator conductors were configured with sufficient space between adjacent turns to permit the much higher thicknesses of insulation required to protect the turns from phase to phase potential voltages. Examples of this spacing can be seen in U.S. Pat. No. 4,151,433 which was issued to Flick on Apr. 24, 1979.

In contradistinction to these previous configurations, the phase coils of the present invention utilize no separate insulative members between turns and provide mechanical support by surrounding each phase coil with generally rigid insulative members which will be described in greater detail below.

Figure 2A:
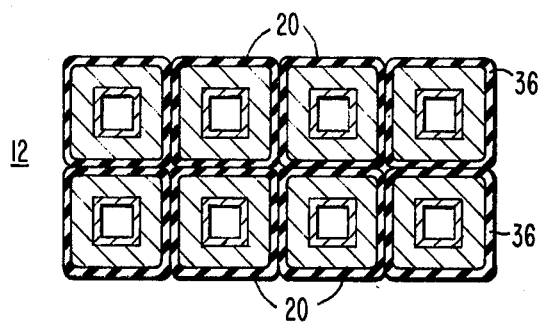
FIG. 2A shows a cross-sectional view of the conductor of the phase coil of FIG. 1, along II—II of FIG. 1.

FIG. 2A shows a cross-section of the conductor 12 of FIG. 1. Each turn of the phase coil of the present invention comprises a number of subconductors 20 which are associated with other similar subconductors to form the conductor 12 which is also shown in FIG. 1.

Although FIG. 2A shows eight subconductors 20 arranged in two layers, it should be understood that this configuration is only one of many that may be used in the present invention. It should further be understood that the subconductors 20 may be electrically transposed as they progress around the phase coil in order to more uniformly distribute the subconductors 20 within the generator's magnetic field.

Figure 3:
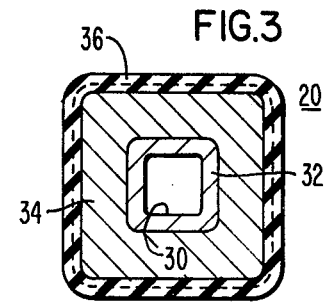
FIG. 3 depicts a single subconductor of the phase coil cross-section of FIG. 2A.

FIG. 3 depicts a single subconductor 20 from the configuration shown in FIG. 2A. This particular subconductor 20 is innercooled, having a coolant passage 30 running through its center according to the preferred embodiment of this invention. The coolant passage is continuous along the entire length of the subconductor so that required external connections can be made at the lead ends of the coil. The coolant passage 30 is provided by disposing a tubular member 32 around which a conductive material 34 is placed. The conductive material 34 may be a multiplicity of small wires individually insulated with a suitable coating, twisted and compacted to the configuration shown. Around the conductive material 34, an insulative covering 36 is provided. The tubular member 32 can be made from stainless steel and the conductive material 34 can be formed from any suitable conductor such as copper and the insulation 36 can be formed from well-known materials such as mica tape or a glass resin material.

Figure 2B:
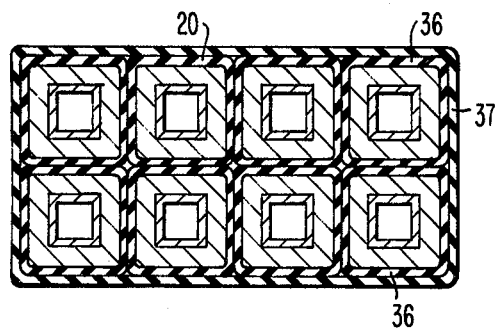
FIG. 2B shows an alternate embodiment of the conductor cross-section shown in FIG. 2A and includes an additional layer of insulation around the conductor.

In FIGS. 2A and 3, the insulation around each subconductor would have to be sufficient to withstand the turn-to-turn voltage potential which is significantly larger than the subconductor-to-subconductor voltage but less than phase-to-phase voltage potentials. An alternate configuration is shown in FIG. 2B. Here, the multiplicity of subconductors 20 each with its own insulation 36 is surrounded by another layer of insulation 37. The insulation layer 37 is made of a suitable material, such as mica tape, to withstand turn-to-turn voltage potentials while the insulation layer 36 can be of a glass resin material and thinner since it has to only withstand the lower subconductor-to-subconductor voltage potentials.

The subconductor 20 can be cooled by passing any suitable coolant through the coolant passage 30. It should be understood that, although the conductor 12 has been described herein with considerable specificity, a phase coil (reference numeral 10 of FIG. 1) can be produced in accordance with the present invention in other suitable configurations.

Figure 4:
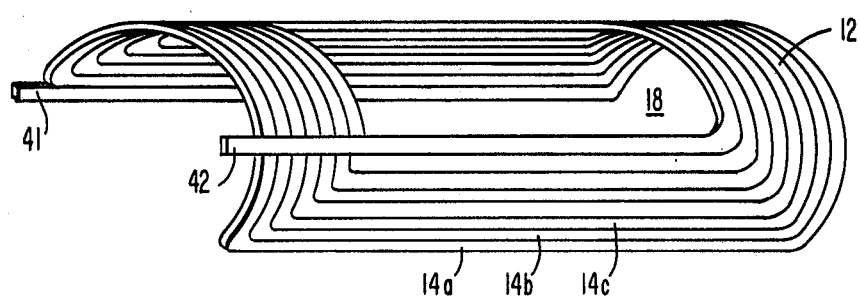
FIG. 4 illustrates a spirally formed phase coil of the present invention.

FIG. 4 illustrates the pancake coil (reference numeral 10 of FIG. 1) formed into a spirally arcuate shape. It should be emphasized that the transverse section of the pancake coil does not describe a segment of a circle but, instead, a section of a spiral. The arcuate shape permits the pancake coil 10 to be associated with other similarly shaped pancake coils in an interleaved helical manner to form a cylindrical stator coil assembly for superconducting dynamoelectric machines.

The pancake coil 10, as described above, is a continuous concentric winding of a conductor 12 around a central cavity 18. This configuration creates an electrical current path which serially connects one of the pancake coil's ends 41 with the other 42.

To those skilled in the art, it will be apparent that coil end 42 is in close proximity to conductors 12 but at increasing potential from successive conductors 12 as it traverses them on the way from the central cavity 18 outward. Accordingly, an increased amount of insulation will be applied to this coil end as it passes successive turns.

Figure 5:
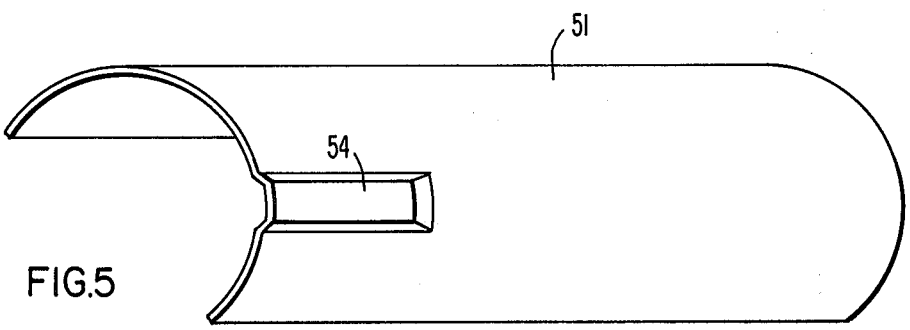
FIG. 5 illustrates an outer insulative skin of the present invention.
Figure 7:
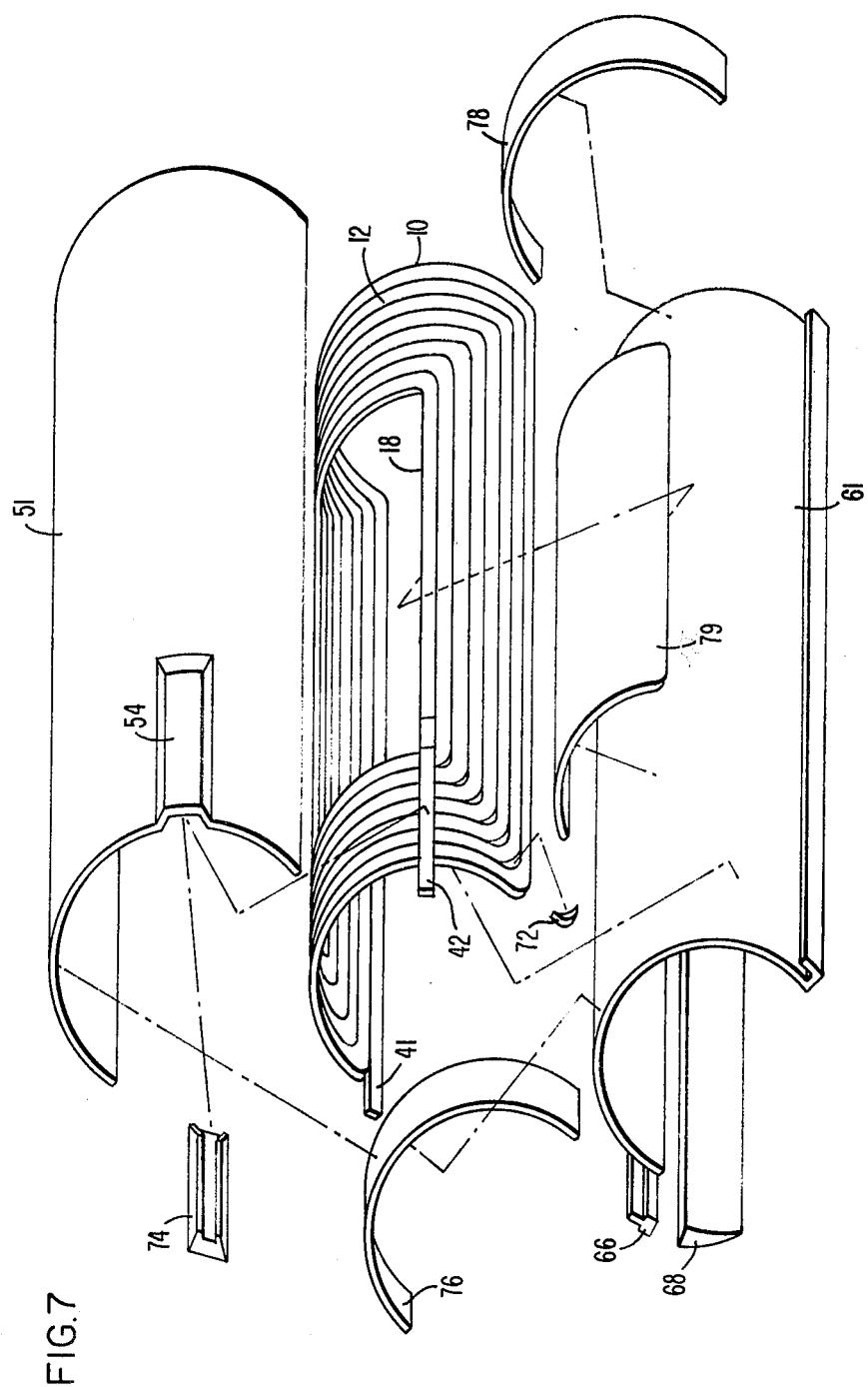
FIG. 7 is an exploded view of a pancake coil module of the present invention.

FIG. 5 shows an insulative outer skin 51 which is formed to fit against the radially outer surface of the pancake coil. Its arcuate dimension is generally equal to that of the pancake coil and its axial dimension is greater than that of the pancake coil, however it should be understood that the arcuate dimension of the outer skin 51 may exceed the pancake coil by some preselected amount while remaining within the scope of the present invention. As shown in FIGS. 5, 7 and 8, the outer skin is provided with a raised portion 54 wich fits over one terminus of the phase coil's conductor (reference numeral 42 of FIG. 4) that is raised above the outer surface of the pancake coil, but the raised portion 54 could, of course, equally be extended the full length of the outer skin 51.

Figure 6:
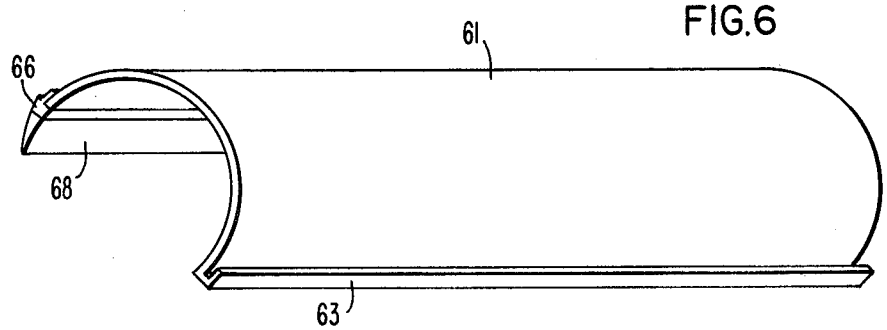
FIG. 6 illustrates an inner insulative skin of the present invention.

FIG. 6 shows the inner insulative skin 61 of the present invention. It is formed to fit against the pancake coil's inner surface. The inner skin 61 is provided with folded edge 63 which acts in cooperation with the outer skin (reference numeral 51 of FIG. 5) to provide electrical insulation along that edge 63. The opposite edge of the inner skin 61 is cooperatively associated with an insulative filler 66 which provides electrical insulation along its associated edge of the inner skin 61. Connected to the insulative filler 66 is another insulative piece 68 which, in association with the other components of the inner skin 61 create a spirally shaped cross-section which terminates at one pointed edge to facilitate its later association with other, similarly constructed, insulated phase coils to form a spirally interleaved stator coil assembly without internal voids. It should be understood that, although folded edge 63 and the insulative filler pieces, 66 and 68, have been shown and described with considerable detail, the present invention should not be considered to be so limited. It should further be understood that alternative embodiments of the folded edge 63 and insulative filler pieces, 66 and 68, are within the scope of the present invention.

The components of the present invention, shown in FIGS. 4, 5 and 6, are illustrated in an exploded view in FIG. 7 which demonstrates how the pieces cooperate to provide both electrical insulation and mechanical support. The outer skin 51 and the inner skin 61 encapsulate the phase coil 10 on its two arcuate surfaces with one of the phase coil's leads 42 fitting under a raised portion 54 of the outer skin 51. It should be apparent that this structure would contain a void at its central cavity 18 region. Therefore, an insulative cavity filler 79 is provided to fill this cavity 18 and support the inner turns, mechanically, from migrating toward the cavity 18 during operation. The lead support 74 fits between the phase coil's lead end 42 and the adjacent turns which it passes over. The lead support 74 also cooperates with the raised portion 54 of the outer skin 51 to provide both electrical insulation and mechanical support to the pancake coil's lead end 42.

Also shown in FIG. 7 are two end filler pieces 76 and 78, which fit between the inner 61 and outer 51 skins at the axial ends of the phase coil 10. These two end filler pieces 76 and 78 cooperate with the inner 61 and outer 51 skins and the insulative filler 66 to provide an electrically insulative encapsulation around the phase coil 10 to withstand phase to phase potential voltage between the phase coil 10 and other similarly configured pancake coil assemblies in a stator of a superconducting generator.

Also shown in FIG. 7 is a corner filler 72 which fits between the outside edge of the conductor at its corner and the inside edge of the adjacent turn. It should be apparent to one skilled in the art that it is impractical to attempt to shape these corners in such a way as to avoid small gaps between turns. Therefore, it has been found that small insulative corner fillers 72 can be inserted at these corner positions in order to prevent voids in the phase coil assembly at these corner locations.

The insulative piece 68 is provided, as described above, to produce a pointed edge which facilitates the interleaving of the phase coil assembly with other phase coil assemblies in a spiral manner and to eliminate voids in the finished assembly.

When the pieces shown in FIG. 7 are bonded together with a suitable bonding compound, they produce a rigid encapsulation around the pancake coil 10. Furthermore, the assembly is generally free of internal voids and provides mechanical support for the pancake coil 10. It should be noted that the only electrical insulation between adjacent turns is that amount (shown in FIGS. 2A, 2B and 3) which is needed to prevent turn-to-turn shorts. This amount of insulation is significantly less than that which could withstand phase-to-phase potentials and which was formerly applied to each turn of the phase coil 10. This reduction permits the size of the phase coil to be significantly smaller than in the past with corresponding cost savings and improvement of the electrical machine's operation.

FIG. 8 shows a complete pancake assembly 80 which comprises the same components shown in the exploded view of FIG. 7. The composite pancake assembly 80 includes inner insulative skin 61, the outer insulative skin 51 with its raised portion 54, the two end filler pieces (reference numerals 76 and 78), the lead support 74 and corner filler pieces 72, the central cavity filler 79, the two end fillers (reference numerals 66 and 68) and, of course, the pancake coil 10. These components are bonded into a single rigid assembly with a suitable bonding agent to form a solid unit. The inner 61 and outer 51 skins, together with the filler pieces 66, 76 and 78 provide both mechanical support and electrical insulation capable of withstanding phase-to-phase voltage potentials. The central cavity filler 79 provides mechanical support that resists movement of the inner turns of the phase coil 10. As described above, the configuration of the present invention allows the turns of the phase coil 10 to be insulated with a reduced amount of insulation since they only have to be protected from turn-to-turn potentials which are significantly lower than either phase-to-phase or phase-to-ground voltage potentials.

FIG. 9 illustrates a spirally wound stator coil assembly 94 that comprises a plurality of pancake coil modules 80. The inner and outer skins (reference numerals 61 and 51, respectively, of FIG. 8) are bonded to the skins of adjacent pancake coil modules 80. This bonding can be done with any suitable resin and results in a generally rigid stator coil assembly 94.

FIG. 10 shows a stator coil assembly 100 made in accordance with the present invention. The bonded pancake coil assembly 94 is shown with leads extending axially therefrom. It should be noted that the interface lines between pancake coils, wich are evident in FIG. 9, have been excluded for purposes of clarity. Details of external electrical and hydraulic connections have likewise been excluded. The twelve leads shown in FIG. 10 (reference numerals $A_1$, $B_1$, $A_2$, $B_2$, $A_3$, $B_3$, $A_4$, $B_4$, $A_5$, $B_5$, $A_6$ and $B_6$) comprise two leads for each of the six pancake coils. In FIG. 8, the two leads extending from the pancake coil module 80 are referenced as $A_1$ and $B_1$. It should be apparent that each pancake coil has two leads, an A and a B lead, which are electrically in series with each other. In FIG. 10, the twelve leads are similarly labeled. Lead $A_1$ is electrically in series with lead $B_1$ and these two coils are, of course, part of the same pancake coil. Similarly, leads $A_2$ and $B_2$ are part of a single pancake coil, and so on. Thus, the six pancake coils illustrated in FIG. 9, assembled as shown, result in the twelve axially extending leads shown in FIG. 10. An outer cylinder 102, made of a non-magnetic material, is disposed radially outward from the pancake assembly 94. Also, an inner non-magnetic cylinder 104 is disposed radially inward from the pancake assembly 94. The inner 104 and outer 102 cylinders cooperate to provide mechanical support for the pancake assembly 94. Both cylinders are bonded to the pancake assembly 94 with a suitable bonding agent, which can be a resin.

It should be apparent that the present invention reduces the size and complexity of a stator phase coil while maintaining mechanical rigidity and insulative capabilities necessary for proper operation.

It should further be apparent that the present invention provides a stator coil assembly wich requires no complex coolant connections. All coolant connections can be made at one axial end of the stator coil assembly which simplifies coolant connections, simplifies maintenance and enables the overall size of the stator structure to be reduced. It should be understood that, although described with considerable specificity, the present invention should not be considered to be limited to the precise embodiment described herein.

What we claim is:

1. A stator phase coil for a superconducting dynamoelectric machine, comprising:
   a phase coil, said phase coil comprising a conductor formed into a plurality of concentric turns, said turns defining a curved shape wth first and second spirally arcuate surfaces;
   an inner electrically insulative skin, said inner skin being generally rigid and disposed proximate said first arcuate surface of said phase coil;
   an outer electrically insulative skin, said outer skin being generally rigid and disposed proximate said second arcuate surface of said phase coil;
   means for electrically insulating the outer edges of said phase coil, said insulating means being disposed between said inner and outer insulative skin, said insulating means being generally rigid;
   means for preventing electrical communication between adjacent of said turns, said preventing means being disposed on the surface of said conductor; and
   a nonmagnetic filler piece disposed between said inner and outer insulative skins and in the center of said phase coil.

2. A stator armature winding for a superconducting generator, comprising:
   a phase coil comprising a plurality of concentrically wound turns of a conductor, said turns describing a spirally arcuate shape having first and second spirally arcuate surfaces, said conductor being coated with electrical insulation;
   a generally rigid first insulative skin disposed adjacent said first arcuate surface;
   a generally rigid second insulative skin disposed adjacent said arcuate surface;
   generally rigid means for electrically insulating the outermost turns of said phase coil from electrical communication with external electrically conductive elements;
   a first means for providing electrical communication between the innermost turn of said phase coil and an external electrically conductive element;
   a second means for providing electrical communication between said outermost turn of said phase coil and an external conductive element, said first and second providing means extending from said phase coil through said electrically insulating means;
   a raised portion of said first insulative skin, proximate said first providing means; and
   rigid means for mechanically preventing said innermost turn from moving away from said outermost turn, said preventing means being nonmagnetic.

3. A dynamoelectric machine comprising:
   an inner insulative cylinder;
   an outer insulative cylinder disposed radially outward from and coaxial with said inner insulative cylinder; and
   a stator coil assembly disposed between and bonded to said inner and outer insulative cylinders, said stator coil assembly being generally cylindrical and including a plurality of phase coils, each of said phase coils comprising:
   (A) a plurality of concentrically wound turns of a conductor, said turns describing a spirally arcuate shape having first and second spirally arcuate surfaces, said conductor being coated with electrical insulation;
   (B) a rigid first insulative skin disposed adjacent said first spirally arcuate surface;
   (C) a rigid second insulative skin disposed adjacent said second spirally arcuate surface;
   (D) rigid means for electrically insulating the outermost turns of said phase coil from electrical communication with external electrically conductive elements;
   (E) a first means for providing electrical communication between the innermost turn of said phase coil and an external electrically conductive element;
   (F) a second means for providing electrical communication between said outermost turn of said phase coil and an external conductive element, said first and second providing means extending from said phase coil through said electrically insulating means;
   (G) a raised portion of said first insulative skin, proximate said first providing means; and
   (H) rigid means for mechanically preventing said innermost turn from moving away from said outermost turn, said preventing means being nonmagnetic.

4. The dynamoelectric machine of claim 3, wherein:
   said conductor has a central bore therethrough for providing fluid communication between its termini.

5. The dynamoelectric machine of claim 4, further comprising:
   means for introducing a fluid into a preselected one of said termini.

6. The dynamoelectric machine of claim 4, further comprising:
   means for removing a fluid from a preselected one of said termini.

* * * * *